May 2, 1950     M. MALLORY     2,506,512
INTAKE CONTROL FOR INTERNAL-COMBUSTION ENGINES
Filed Sept. 5, 1947     2 Sheets-Sheet 1

INVENTOR
Marion Mallory

BY Owen & Owen

ATTORNEYS

May 2, 1950  M. MALLORY  2,506,512
INTAKE CONTROL FOR INTERNAL-COMBUSTION ENGINES
Filed Sept. 5, 1947  2 Sheets-Sheet 2
FIG.3.
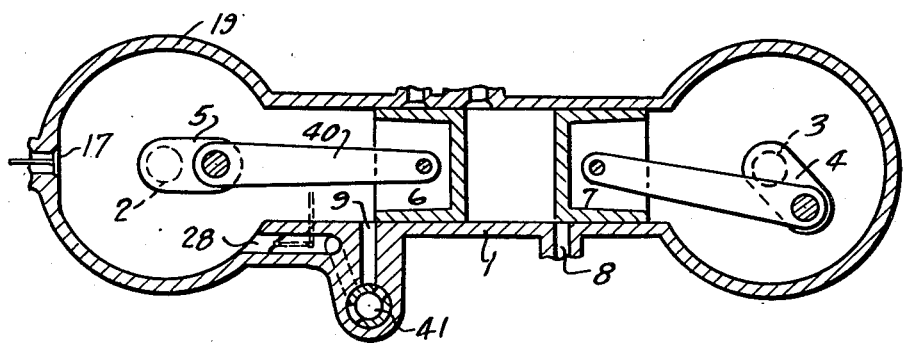
FIG.4.
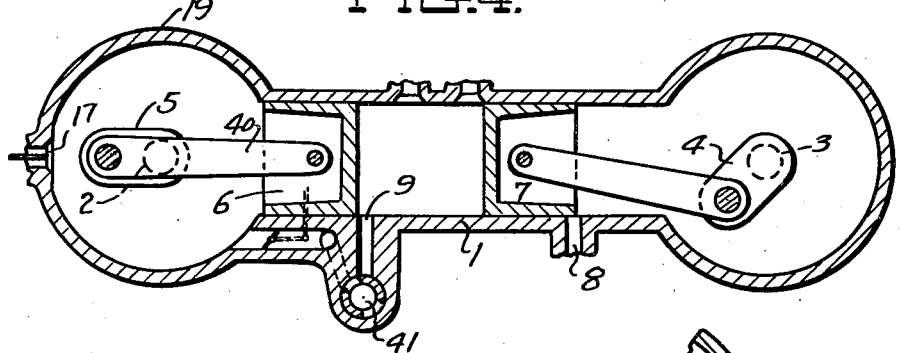
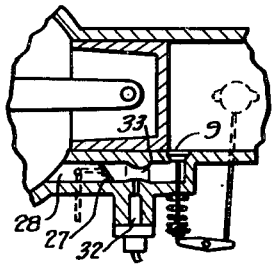
FIG.6.
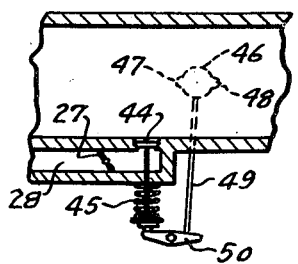
FIG.8.
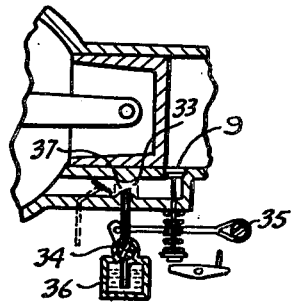
FIG.7.
INVENTOR
Marion Mallory
BY Owen & Owen
ATTORNEYS Patented May 2, 1950

2,506,512

UNITED STATES PATENT OFFICE 2,506,512

INTAKE CONTROL FOR INTERNAL-COMBUSTION ENGINES

Marion Mallory, Detroit, Mich., assignor to The Mallory Research Company, Detroit, Mich., a corporation of Michigan Application September 5, 1947, Serial No. 772,298

7 Claims. (Cl. 123—51)

This invention relates to internal combustion engines of the opposed piston type, and more specifically it relates to an improvement in an engine of the type disclosed in my prior Patent 2,345,056, granted March 28, 1944, and reissued April 8, 1947, No. 22,863.

In an engine of the type referred to, one of the opposed pistons reciprocates twice as many times as the other, the slow-moving piston uncovering an exhaust port near the outer end of its travel and the fast moving piston uncovering an inlet port near the end of its outer travel. The arrangement results in opening the inlet port twice for each time the exhaust port is opened. The present invention relates to supplemental control of the inlet port whereby more efficient operation is obtained when the parts are timed as shown in my said prior patent, and the dependence is not placed entirely upon the movement of the fast moving piston to govern the opening and closing of the inlet port. Other details of the invention will appear as the description proceeds.

Figure 1:
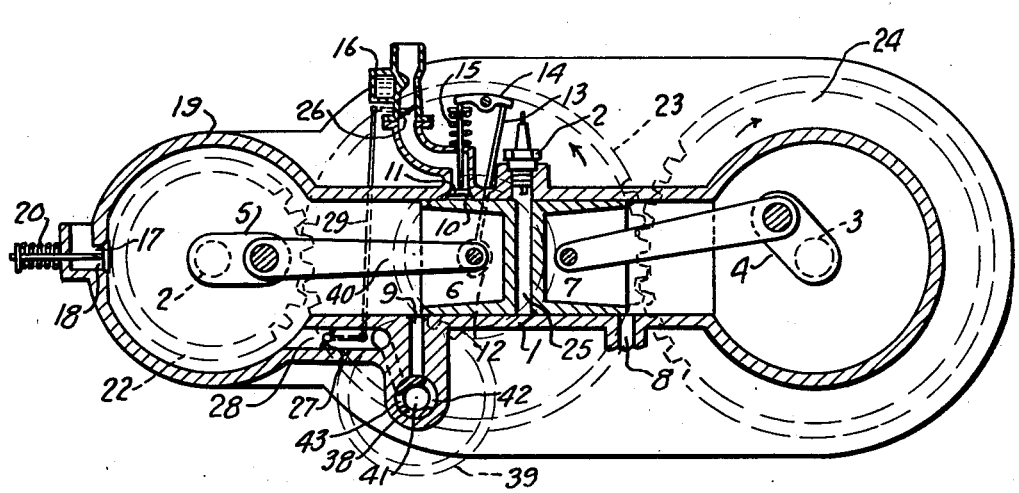
Figure 2:
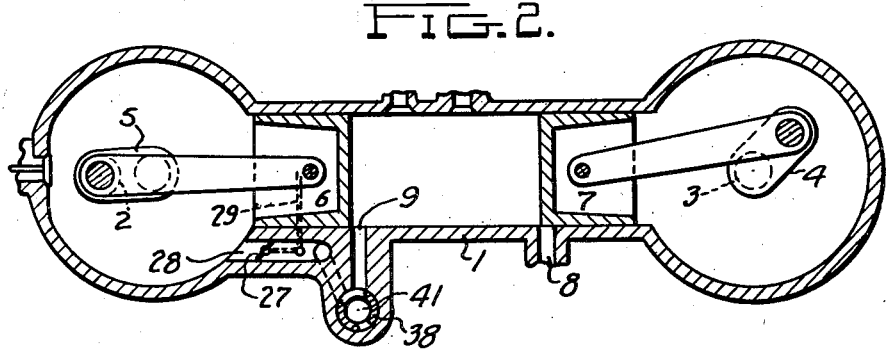
Figure 5:
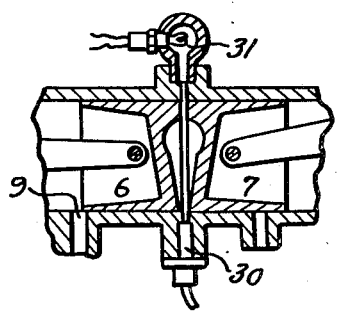

In the accompanying drawings, forming a part of this specification, one form of the invention is shown as applied to an engine made in accordance with my said prior patent, and in these drawings, Fig. 1 is a longitudinal section through the engine showing the position of the parts near the beginning of the firing stroke; Fig. 2 is similar to Fig. 1 but omits certain parts and the parts shown are near the end of the power stroke; Fig. 3 is similar to Fig. 2, but showing the positions near the end of the exhaust stroke; Fig. 4 is similar to Fig. 3, but showing the positions near the end of the intake stroke; Figs. 5, 6 and 7 are detail sectional views showing modified forms of means for fueling the engine; and Fig. 8 is a detail view of another form of valve control for the inlet port.

The parts shown in any prior patent will be briefly described, and then the illustrated embodiment of the improvement. The apparatus shown comprises a cylinder 1 having crank shafts 2 and 3 with cranks 4 and 5 positioned across opposite ends. Pistons 6 and 7 are operated by cranks 2 and 3. An exhaust port 8 is uncovered by piston 7 while its crank passes outer dead center, and an inlet port 9 is uncovered by piston 6 as its crank passes outer dead center.

Fuel may be admitted to the cylinder through port 10, or in other ways to be described later. Port 10 is controlled by a valve 11 which is operated from a cam 12 through push rod 13 and rocker 14. A spring 15 closes the valve when it is not opened by the cam. Fuel is supplied to port 10 from a carburetor 16.

A check valve 17 admits air through a port 18 into crankcase 19 when the pressure in the crank case is less than atmospheric and overcomes a spring 20 that normally closes the valve.

A spark plug 21 is provided for firing the charges in the usual manner. A gear 22 on crankshaft 2 meshes with an intermediate gear 23 carrying cam 12 and meshing with gear 24 on shaft 3. The gears are so related that piston 6 reciprocates twice while piston 7 reciprocates once, and cam 12 rotates at the same speed as the crank connected to piston 7. The space between pistons 6 and 7 forms a combustion chamber 25.

A throttle valve 26 is provided for the carburetor, and a throttle valve 27 is provided in the passage 28 between crank case 19 and port 9. A rod 29 connects valves 26 and 27 so that they open and close simultaneously.

Instead of carburetor 16 and port 10, there may be employed a fuel injection nozzle 30 with firing glow plug 31, as shown in Fig. 5, or an injection nozzle 32 may be located in port 9, as shown in Fig. 6, and atomization effected by Venturi tube 33, and spark plug 21 may be used for firing. If preferred, the construction shown in Fig. 7 may be used in which a fuel valve 34 is operated by a cam 35 to inject fuel from a bowl 36 and nozzle 37 by suction produced by Venturi tube 33. Cam 35 is timed with gear 23.

The foregoing construction is all as described in said prior patent. The present invention adds a valve to control port 9. In Figs. 1 to 4 this valve is shown as a rotary valve 38 turned by a gear 39 meshing with a gear 40 turning with gear 23, so that the valve rotates once for each rotation of gear 23. Valve 38 is provided with a central bore 41, communicating with passage 27 to the crank case, and side ports 42 and 43 which register in succession with port 9.

In Fig. 8 there is shown a valve 44 which may be employed in place of valve 38. Valve 44 is normally closed by a spring 45, but is opened when desired by a cam 46 rotating with gear 23 and having thereon rises 47 and 48 which encounter in succession a push rod 49 opening valve 44 at desired intervals through rocker 50.

The operation of the engine may be substantially as described in my prior patent except for the control port 9. In the embodiment illustrated, when piston 6 is at inner dead center, as shown in Fig. 1, piston 7 is about 45 degrees past dead center. Since piston 6 reciprocates twice during one reciprocation of piston 7, it continues to move in faster than piston 7 moves out until piston 6 is nearly to dead center. Firing is preferable just before the pistons are nearest together, shortly before the position shown in Fig. 1, with piston 7 well past dead center, so that the crank connected to piston 7 is at an advantageous angle to utilize the power of the explosion.

The working stroke continues until piston 6 has moved to outer dead center, uncovering port 9, which at that time receives air under compression through port 42 of valve 38 or through the opening of valve 44 by cam rise 47. At about this time, piston 7 begins uncovering exhaust port 8, as appears from Fig. 2.

Compressed air continues entering through port 9 until it is covered by inward movement of piston 6, and continued inward movement of piston 6 moves the compressed air towards the exhaust port, aiding in the scavenging of the cylinder. The exhaust port 8 remains uncovered until about the position shown in Fig. 3 is reached.

On the next outward stroke of piston 6 it races away from piston 7 and so creates a partial vacuum before it uncovers port 9. Port 43 registers with port 9 when piston 6 first uncovers port 9, so that a second charge of compressed air may enter at that time. However, port 43 passes out of register with port 9 before the pistons again approach each other enough to build up back pressure. If valve 44 is employed, cam rise 48 controls the opening and closing of the valve in like manner.

In the operation of my prior patent, it will be seen that the combined inward movement of both pistons from the position shown in Fig. 4 materially reduces the space between the pistons before port 9 is completely closed, thus tending to create a backward surge from the cylinder through port 9 into the crank case, especially as the pressure in the crank case, which tended to equalize with that in the cylinder during the opening of port 9 on the outward stroke of piston 6, is reduced by the outward movement of piston 6 at the same time that pressure in the cylinder is increasing. Such backward surge is always objectionable, since it necessarily reduces the charge of air which may support combustion, and it is especially objectionable when carbureted fuel is mixed with the air before such backward surge.

The charging of fuel, either carbureted or of the Diesel engine type, may take place in accordance with well known principles and in any one of a variety of manners, as will be readily understood from inspection of the described construction, and need not be described in detail.

While the operation of the device and the utilization of valve 38 or 44 has been shown and described in an arrangement wherein piston 7 has a lead of about 45° at the firing point, it will be readily understood that such lead may be varied considerably, with appropriate adjustment of the ports and valves. However, the arrangement shown gives piston 7 the maximum leverage during the 90° it moves while piston 6 is making its full 180° outer stroke. In fact, the working stroke begins before the position shown in Fig. 1 is reached, as explained above, and when piston 6 starts inward from outer dead center it must pick up speed through a number of degrees before it equals the continued outer speed of piston 7, the crank of which is at about 45°. Consequently, the actual working stroke may be longer than 180° for piston 6. If desired, the uncovering of the exhaust port may be delayed until somewhat after the position shown in Fig. 3 is reached, and if port 9 is found to be uncovered too soon, valve 38 or 44 may be adjusted so that it does not open until the desired interval after piston 6 begins to uncover port 9.

It will be seen from the above that the addition of valve 38 or 44 to govern port 9 in a combination such as shown and described in my prior patent makes possible a fuller charge and consequently greater power, as well as making feasible lengthening of the working stroke and other desirable variations. It will be understood also that the advantage of the additional valve for governing the inlet port uncovered by the fast moving piston might be very similar even if the opposed slow moving piston was relatively timed so that the exhaust needed to be governed by means other than merely uncovering it by the slowing moving piston. Where the fast moving piston on one outward movement uncovers an inlet port for scavenging and on its next outward movement uncovers the same port for charging, an additional valve for exact timing of such scavenging and timing port is advantageous however the exhaust is governed, although it has especial application to the particular arrangement shown in this application.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. In an internal combustion engine having a cylinder with an inlet port thereinto and a piston reciprocating in the cylinder, uncovering the port at the outer end of its travel and making two complete reciprocations for each working stroke of the engine whereby the port is uncovered twice for each working stroke, a valve controlling admission to said port and means operating the valve in timed relation with the piston and admitting fluid to the port for different intervals on the two uncoverings of the port for each stroke.

2. An engine in accordance with claim 1 and in which the valve is a rotary sleeve with two side ports of different sizes registering with the port successively while the port is uncovered the two times during each working stroke.

3. In an internal combustion engine having a cylinder with an inlet port near one end and an exhaust port near the other end and opposed pistons reciprocating in opposite ends of the cylinder and uncovering the respective ports at the outer portions of their travels, the piston at the inlet end reciprocating twice for each reciprocation of the piston at the exhaust end, a valve controlling admission to the inlet port, and means timing the valve in relation to the reciprocation of the pistons.

4. An engine in accordance with claim 3 and in which the piston at the exhaust end has a lead over the other piston and is past inner dead center at the beginning of the working stroke.

5. An engine in accordance with claim 3 and the valve-timing means being constructed to open the valve during substantially all of the time the port is uncovered the first time after the working stroke and to open it only during substantially the first half of the second time the port is uncovered after the working stroke.

6. An engine in accordance with claim 3 and having the valve timing means constructed to close the valve during the second half of time the port is uncovered the second time after the working stroke.

7. In an internal combustion engine having a cylinder with an inlet port near one end and an exhaust port near the other end, and opposed pistons reciprocating in opposite ends of the cylinder and uncovering the respective ports when in their outer positions, the piston at the exhaust end making one reciprocation to the other's two, having a lead over the other piston and being past inner dead center at the beginning of the firing stroke, whereby the inlet is uncovered once at the beginning of the exhaust period and once at the ending of the exhaust period, a valve controlling admission to the exhaust port, and means timing the valve in relation to the pistons to close the valve during the inward travel of the piston at the inlet end the second time it uncovers the inlet port after the working stroke.

MARION MALLORY.

REFERENCES CITED

The following references are of record in the file of this patent:

UNITED STATES PATENTS

| Number | Name | Date |
| --- | --- | --- |
| 1,093,944 | Moreton | Apr. 21, 1914 |
| 1,505,451 | Wall | Aug. 19, 1924 |
| 2,140,503 | Beckman | Dec. 20, 1938 |

FOREIGN PATENTS

| Number | Country | Date |
| --- | --- | --- |
| 858,038 | France | 1940 |